Dec. 18, 1928.

P. R. HOOPES

TRIMMING MACHINE

Filed Aug. 30, 1923

1,695,688

2 Sheets-Sheet 1

Inventor
Penrose R. Hoopes
By his Attorneys
Emery, Booth, Janney & Varney

Dec. 18, 1928.

P. R. HOOPES 1,695,688

TRIMMING MACHINE

Filed Aug. 30, 1923    2 Sheets-Sheet 2

Patented Dec. 18, 1928.

1,695,688

UNITED STATES PATENT OFFICE.

PENROSE R. HOOPES, OF HARTFORD, CONNECTICUT, ASSIGNOR TO ESSEX RUBBER COMPANY, OF TRENTON, NEW JERSEY, A CORPORATION OF NEW JERSEY.

TRIMMING MACHINE.

Application filed August 30, 1923. Serial No. 660,075.

This invention relates to cutting machines and pertains more particularly to a device for trimming the overflow from rubber heels or other moulded articles.

It is an object of this invention to provide a mechanism which will trim the overflow from moulded articles in a simple and efficient manner. It is a further object to provide a mechanism of the character described which will perform the trimming operation surely and accurately without danger of damaging the article.

Other objects and advantages of the invention will appear hereinafter.

Figure 1:
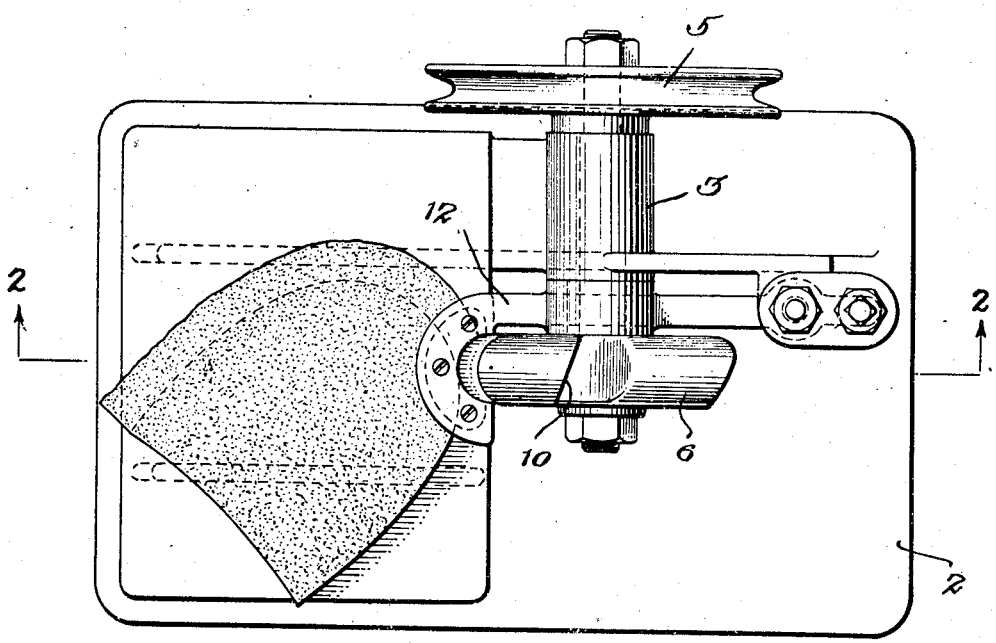
Figure 2:
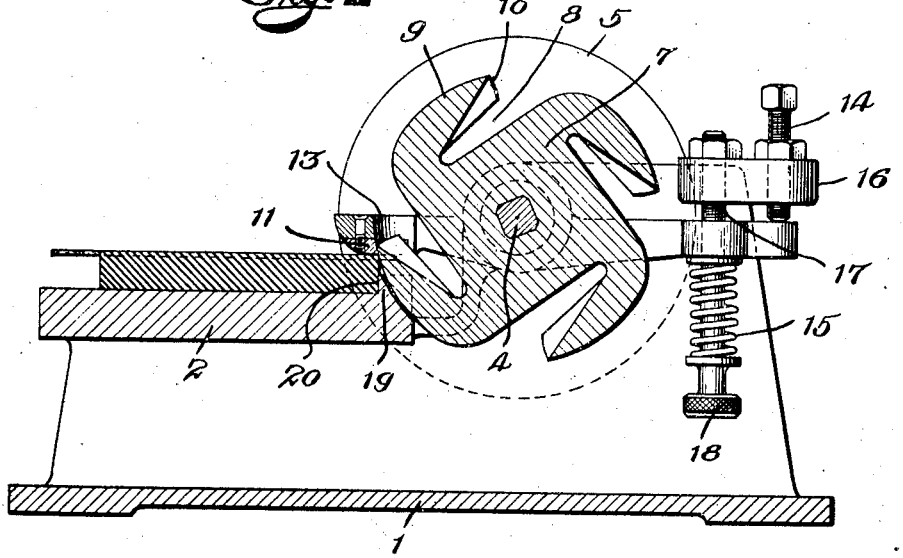
Figure 3:
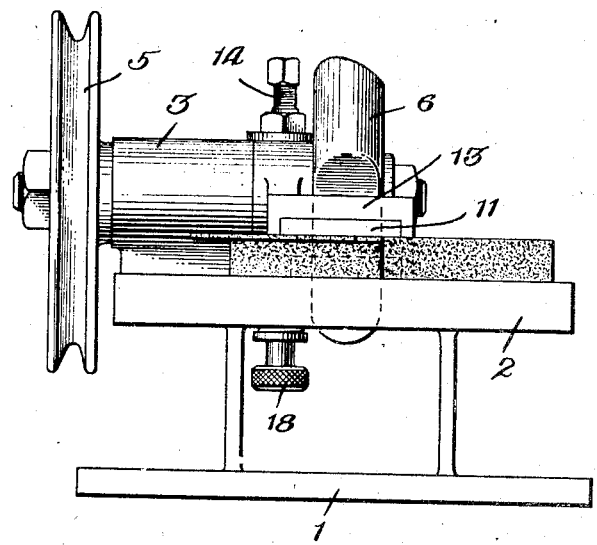
Figure 4:
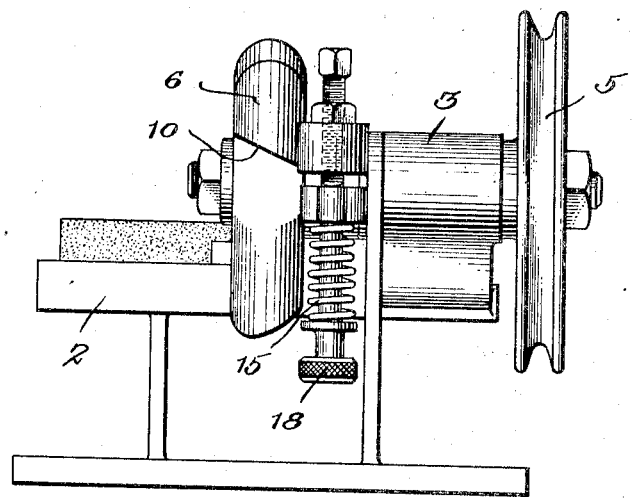

A preferred embodiment of the invention selected for purposes of illustration is shown in the accompanying drawings, in which, Figure 1 is a plan view of the device, Figure 2 is a section on the line 2—2 of Figure 1, Figures 3 and 4 are front and rear views, respectively.

Referring to the drawings, the device may be supported upon a frame 1 having a platform 2 upon which a heel or other article to be trimmed may be supported and moved to trimming position. At one side of the frame adjacent the platform and supported by the frame is a boss 3 in which is journaled a shaft 4, on one end of which is mounted a pulley 5 which may be secured to the shaft for rotation therewith in any suitable manner. The opposite end of the shaft 4 carries a cutter 6 also suitably secured to the shaft for rotation therewith. The shaft and cutter may be rotated by the pulley 5 from a suitable source of power.

The cutter 6 comprises a web 7 which is undercut at 8 to form a plurality of blades 9, the cuts being preferably made in such manner that the cutting edges 10 extend diagonally across the surface of the cutter from one side to the other. A cooperating cutting blade 11 is mounted on an arm 12 and both the blade and arm are cut away as at 13 to conform to the shape of the outer periphery of the cutter across its entire width. The arm 12 is journaled on the shaft 4 and is permitted a slight degree of rotation thereon, such rotation being positively limited in one direction by the set screw 14 and in the other direction being opposed by the spring 15. The set screw is threaded through a lug 16 projecting from the main frame 1, and the spring surrounds a screw 17 also threaded therein. The screw 17 carries a thumb nut 18 by which the pressure of the spring on the arm 12 may be adjusted.

The platform 2 carries on the side adjacent the cutter 6, a guide 19 also shaped to conform to the contour of the outer periphery of the cutter. This guide is provided with a substantially vertical face 20 to guide the article to be trimmed into proper relation with the cutter blades, and prevent damage to the article by being moved too close thereto as is hereinafter set forth.

The operation of the device may be conveniently described with reference to a rubber heel from which it is desired to remove the overflow. The cutter 6 is set in rotation in a clockwise direction in Figure 2 at a moderately high rate of speed by means of the pulley 5. The heel to be trimmed is laid on the platform 2 and slid thereon into proximity with the cutter, the cutting blade 11 having been previously adjusted by the set screw 14 to a position such that the distance between the blades and the platform is less than the least thickness of the heel to be trimmed.

As the heel approaches the cutters, it is forced under the blade 11 and rotation of the cutter 6 will trim the overflow therefrom as it comes between the cutting edges 10 and the edge of the cutting blade 11. The heel is then rotated, keeping the outer periphery thereof constantly pressed against the vertical face 20 of the guide 19 until all points of the periphery have been exposed to cutting action.

It will be observed that if the thickness of the heel varies, or if the heel is not flat as in convex and concave heels, the blade 11 may rise and fall to accommodate the varying thicknesses, the blade being constantly pressed against the heel by the spring 15. The degree of pressure on the heel may be regulated by suitable adjustment of the thumb screw 18 holding the spring.

It is to be understood that the invention is not limited to the embodiment herein shown for purposes of illustration but that on the contrary it may be variously modified and embodied within the scope of the subjoined claims.

I claim as my invention:

1. A trimming device, comprising, a rotary cutter, and a cooperating cutting edge mounted for rotary adjustment on an axis concentric with the axis of rotation of said cutter; a platform, and means to urge said cutting edge toward said platform.

2. A trimming device, comprising, a rotary cutter, and a cooperating cutting edge mounted for rotary adjustment on an axis concentric with the axis of rotation of said cutter; a guide, and yielding means to urge said cutting edge toward said guide.

3. A trimming device, comprising, a rotary cutter, a normally stationary cutting edge mounted in shearing relation thereto; a platform, and means for adjusting said edge with respect to said platform to accommodate objects of varying thickness.

4. A trimming device, comprising, a rotary cutter, a cutting edge mounted in shearing relation thereto; a platform, and yielding means to urge said edge toward said platform to bear against the work being trimmed.

5. A trimming device, comprising, a rotary cutter, a cutting edge mounted in shearing relation thereto; a platform, means to adjust said edge with respect to said platform, and yielding means to urge said edge toward said platform to bear against the work being trimmed.

6. A trimming device, comprising, a rotary cutter having a curved periphery, a cutting edge curved to conform thereto, said cutting edge being mounted for rotary adjustment on an axis concentric with the axis of rotation of said rotary cutter.

7. A trimming device, comprising, a shaft having a cutter head mounted thereon, a normally stationary cutting edge also mounted thereon for rotation and arranged in shearing relation to said cutter head, means to rotate said shaft, and means to limit the rotation of said cutting edge.

In testimony whereof, I have signed my name to this specification this 25th day of August, 1923.

PENROSE R. HOOPES.